US012506971B2

(12) United States Patent
Yeo et al.

(10) Patent No.: US 12,506,971 B2
(45) Date of Patent: Dec. 23, 2025

(54) SENSOR FOR ACCUMULATION SIGNAL

(71) Applicant: Samsung Electronics Co., Ltd., Suwon-si (KR)

(72) Inventors: Donghee Yeo, Seoul (KR); Junseok Kim, Hwaseong-si (KR); Heejae Jung, Suwon-si (KR); Hyunsurk Ryu, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/151,768

(22) Filed: Jan. 9, 2023

(65) Prior Publication Data
US 2023/0164457 A1 May 25, 2023

Related U.S. Application Data

(63) Continuation of application No. 16/584,148, filed on Sep. 26, 2019, now Pat. No. 11,558,573.

(30) Foreign Application Priority Data

Feb. 11, 2019 (KR) .................. 10-2019-0015606

(51) Int. Cl.
*H04N 23/71* (2023.01)
*H04N 25/766* (2023.01)
*H04N 25/78* (2023.01)

(52) U.S. Cl.
CPC .......... *H04N 23/71* (2023.01); *H04N 25/766* (2023.01); *H04N 25/78* (2023.01)

(58) Field of Classification Search
CPC ...... H04N 23/667; H04N 23/71; H04N 25/75; H04N 25/766; H04N 25/707; H04N 25/76; H04N 25/78
See application file for complete search history.

(56) References Cited

U.S. PATENT DOCUMENTS

| 5,216,410 | A | 6/1993 | Pildner et al. |
| 7,584,312 | B2 | 9/2009 | Kuroda et al. |
| 9,549,158 | B2 | 1/2017 | Grauer et al. |
| 10,083,349 | B2 | 9/2018 | Park et al. |

(Continued)

FOREIGN PATENT DOCUMENTS

| CN | 1756164 A | 4/2006 |
| CN | 108574809 A | 9/2018 |

(Continued)

OTHER PUBLICATIONS

Office Action dated Jun. 14, 2022 for corresponding U.S. Appl. No. 16/584,148.

(Continued)

*Primary Examiner* — Antoinette T Spinks
(74) *Attorney, Agent, or Firm* — Harness, Dickey & Pierce, P.L.C.

(57) ABSTRACT

A sensor includes a determining circuit and an output circuit. The determining circuit receives a first signal from a pixel in response to light and outputs a second signal associated with occurrence of an event, based on the first signal. Based on the second signal being received in a time period between a first time when a third signal is received from a processor and a second time when a condition is satisfied, the output circuit outputs a fourth signal associated with occurrence of the event in the time period to the processor after the second time.

12 Claims, 13 Drawing Sheets

(56) References Cited

U.S. PATENT DOCUMENTS

| | | | |
|---|---|---|---|
| 10,516,841 B2 | 12/2019 | Kim et al. | |
| 10,847,255 B2 | 11/2020 | Hattori | |
| 2012/0268425 A1 | 10/2012 | Hwang et al. | |
| 2014/0063294 A1 | 3/2014 | Tatsuzawa et al. | |
| 2015/0365617 A1 | 12/2015 | Chen | |
| 2016/0078321 A1 | 3/2016 | Wang et al. | |
| 2017/0085819 A1 | 3/2017 | Lee et al. | |
| 2017/0241774 A9 | 8/2017 | Brandli et al. | |
| 2018/0032150 A1 | 2/2018 | Lee et al. | |
| 2018/0189959 A1 | 7/2018 | Berner et al. | |

FOREIGN PATENT DOCUMENTS

| | | |
|---|---|---|
| JP | 2007-095040 A | 4/2007 |
| JP | 2012-227925 A | 11/2012 |
| KR | 10-2014-0031086 A | 3/2014 |
| KR | 1020190133952 | 8/2019 |
| KR | 1020190133465 | 12/2019 |
| WO | WO-2015/107747 A1 | 7/2015 |

OTHER PUBLICATIONS

Office Action dated Dec. 20, 2021 for corresponding U.S. Appl. No. 16/584,148.

SENSOR FOR ACCUMULATION SIGNAL

CROSS-REFERENCE TO RELATED APPLICATION

The present application is a continuation of and claims priority under 35 U.S.C. § 120 to U.S. patent application Ser. No. 16/584,148, filed on Sep. 26, 2019, which claims priority to 35 U.S.C. § 119 to Korean Patent Application No. 10-2019-0015606, filed on Feb. 11, 2019, in the Korean Intellectual Property Office, the disclosure of which is hereby incorporated by reference in its entirety.

TECHNICAL FIELD

Example embodiments of the present disclosure relate to sensors, and, more specifically, to sensors outputting signals in response to stimulation from the outside.

DISCUSSION OF RELATED ART

With development of a semiconductor technique, various sensors are used. A sensor is a charge coupled device (CCD) image sensor, a dynamic vision sensor (DVS), an ambient light senor (ALS), or a proximity sensor (PS).

An electronic device may be configured to respond to stimulation from outside, using the sensor. The stimulation from outside may be a change of intensity of light or a user's touch, etc. When the stimulus comes from outside to the sensor (when the stimulus from outside is sensed by the sensor), the sensor may be configured to output an electrical signal. The electronic device may recognize a motion of an external object or a change of an external environment based on the electrical signal.

As an interaction between the external environment and the electronic device becomes important, a demand for the electronic device including various sensors increases.

SUMMARY

According to some example embodiments of the inventive concepts, a sensor may include a determining circuit and an output circuit. The determining circuit may be configured to receive a first signal received from a pixel in response to light, and output a second signal based on the first signal, the second signal being associated with occurrence of an event. The output circuit may be configured to receive the second signal, receive a third signal from a processor, and output a fourth signal to a processor, based on the second signal being received in a time period between a first time when the third signal is received and a second time when a condition is satisfied, and the fourth signal is output after the second time.

According to some example embodiments of the inventive concepts, a sensor may include a determining circuit and an output circuit. A determining circuit may be configured to output a first signal based on an event in which a change in an external environment observed by a pixel. An output circuit may be configured to operate in an accumulation mode, based on the event occurring multiple times and the first signal being received multiple times, based on a first condition, the first condition being the first signal being received during a period and to output a second signal associated with the first signal received in the accumulation mode after a second condition is satisfied, based on the first signal being received in the accumulation mode.

According to some example embodiments of the inventive concepts, a sensor may include a controller and an output circuit. The controller configured to output a first signal, based on a period when an event being a change in an external environment occurs or based on a second signal received from a processor, the first signal having a first logical value or a second logical value different from the first logical value. An output circuit may be configured to output a third signal to the processor, based on the event occurring between a first time when the second signal having the first logical value is received and a second time when the second signal having the second logical value is received, the third signal indicating that the event occurred, the outputting the third signal being after the second time.

BRIEF DESCRIPTION OF THE DRAWINGS

The above and other objects and features of some inventive concepts will become apparent by describing in detail some example embodiments thereof with reference to the accompanying drawings.

DETAILED DESCRIPTION

Figure 1:
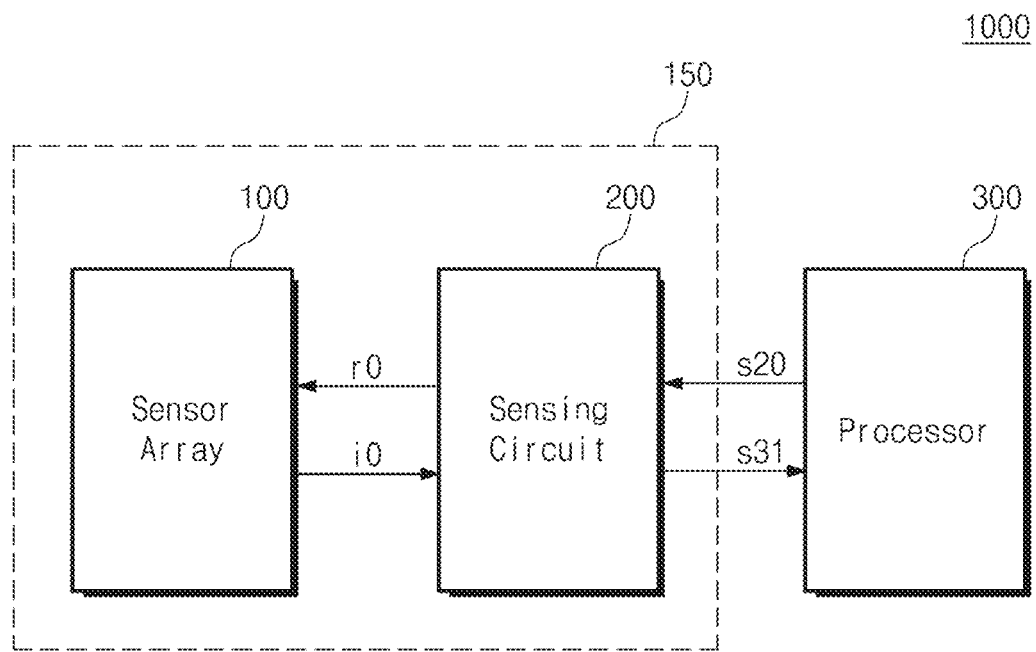
FIG. 1 is a block diagram illustrating an electronic device including a sensing circuit according to some example embodiments.

Various example embodiments will now be described more fully hereinafter with reference to the accompanying drawings. Like reference numerals may refer to like elements throughout this application.

FIG. 1 is a block diagram illustrating an electronic device including a sensing circuit according to some example embodiments.

Referring to FIG. 1, an electronic device 1000 may include a sensor 150 and a processor 300. The electronic device 1000 may be one of various electronic devices, such as a smart phone, a tablet personal computer, a laptop personal computer, an electronic book reader, an MP3 player, or a wearable device, etc.

The electronic device 1000 may be configured to respond to stimulation from the outside. The sensor 150 may be configured to output a signal (i.e., electronic signal) s31 when the stimulus comes from the outside to the sensor 150. The sensor 150 may be one of various sensors, such as a dynamic vision sensor (DVS), a proximity sensor (PS), etc. For example, when the sensor 150 includes a DVS, the DVS may be configured to output the signal s31 when an intensity of a received light is changed. For example, when the sensor 150 includes a PS, the PS may detect that an outside object approaches. The PS may be configured to output the signal s31 when the object is located in a specific area.

The sensor 150 may include a sensor array 100 and a sensing circuit 200. Hereinafter, it is assumed that the sensor array 100 and the sensing circuit 200 may be used to constitute a dynamic vision sensor (DVS), but the inventive concept is not limited thereto.

The sensor array 100 may be configured to receive light from the outside. The sensor array 100 may detect the stimulation from the outside. For example, the sensor array 100 may be configured to detect a change in the intensity of the received light. The sensor array 100 may be configured to receive a signal r0 from the sensing circuit 200. When the change in the intensity of the light is detected, the sensor array 100 may be configured to output ("generate") a current i0 in response to the signal r0.

The sensing circuit 200 may be configured to receive the current i0. The current i0 may indicate the change in the intensity of the light. The current i0 may indicate a degree of change in the intensity of the light. The sensing circuit 200 may be configured to determine occurrence of an event (whether the event has occurred) or stimulation based on the current i0. Specifically, when the degree of change in the intensity of the light is relatively small, the sensing circuit 200 may be configured to determine that an event has not occurred. When the degree of change in the intensity of the light is relatively great, the sensing circuit 200 may be configured to determine that an event has not occurred. For example, that an event has occurred may mean that the stimulation from the outside has occurred, such as that the external object has moved, that the electronic device 1000 has moved, or that a user has touched the electronic device 1000.

The sensing circuit 200 may be configured to output the signal s31 when the sensing circuit 200 has determined that an event has occurred. The sensing circuit 200 may be configured to determine a logical value according to an occurrence of an event. For example, the signal s31 may have a first logical value when it is determined that an event has occurred. For example, the signal s31 may have a second logical value when it is determined that an event has not occurred. The first logical value may be different from the second logical value. For example, the first logical value may be expressed as a logical value of "1", and the second logical value may be expressed as a logical value of "0", but the inventive concept is not limited thereto. Hereinafter, that the signal s31 is output ("generated") may correspond to the signal s31 having a logical value of "1". In addition, that the signal s31 is not output may correspond to the signal s31 having a logical value of "0." This correspondence may be applied to all the signals which will be described hereinafter.

The processor 300 may be configured to receive the signal s31. The signal s31 may indicate that the event has occurred. The processor 300 may be configured to respond to the stimulation from the outside based on the signal s31. For example, the processor 300 may be configured to display an image on a display panel based on the signal s31. For example, the processor 300 may be configured to change an operation mode of at least one of the components.

The event may irregularly occur. Thus, the signal s31 may be irregularly generated. Accordingly, the processor 300 may be configured not to predict when the signal s31 is received. In addition, the processor 300 may be configured not to predict how much data the signal s31 includes. If many, or a lot of signals s31 are suddenly received or if the signal s31 is received at time when a workload of the processor 300 is high, the processor 300 may not process the signal s31. Hereinafter, the case in which the processor 300 does not process the signal s31 when a lot of signals s31 are suddenly received or when the signal s31 is received at time when the processor 300 has the large workload may refer to a case in which the processor 300 is in a busy state. For example, when the number of times the signals s31 is received per unit time is more than a reference number or when the workload of the processor 300 is more than a reference size (workload), the processor 300 may be in the busy state.

When the processor 300 is in the busy state, the electronic device 1000 may be configured to use various methods to process the signal s31. For example, the processor 300 may be configured to store data included in the signal s31 in an additional buffer and/or memory until the signal s31 is able to be processed. In addition, additional power may be consumed to store and process the data. In some example embodiments, the electronic device 1000 may be configured to lower an event rate of the sensor 150. The event rate may be related to a period when the signal r0 is output and/or a period when the sensing circuit 200 determines the occurrence of the event. In this case, a blurring phenomenon may be found in the image (still or moving image) displayed on the display panel. For example, the blurring phenomenon may be a phenomenon in which the image blurs on the screen, or the image is cut-off when the image is converted. In some example embodiments, the electronic device 1000 may discard the signal s31 itself. In this case, the data itself included in the signal s31 may be lost, and thus the performance (e.g., accuracy) of the sensor s31 may be lowered.

In some example embodiments, when the processor 300 is in the busy state, the electronic device 1000 may be configured to process the signal s31 using methods different from the aforementioned methods. For example, when the processor 300 is in the busy state, the processor 300 may be configured to output a signal s20. The sensing circuit 200 may be configured to operate in an accumulation mode when the signal s20 is received. However, the inventive concept is not limited to thereto. For example, the sensing circuit 200 may be configured to operate on its own in the accumulation mode even when the signal s20 is not received. For example, the sensing circuit 200 may be configured to operate in the accumulation mode based on a period when the signal s31 is output. The sensing circuit 200 may be configured not to output the signal s31 during operating in the accumulation mode. The configurations and operations of the sensing circuit 200 will be described in detail with reference to FIGS. 3 to 13.

Figure 2:
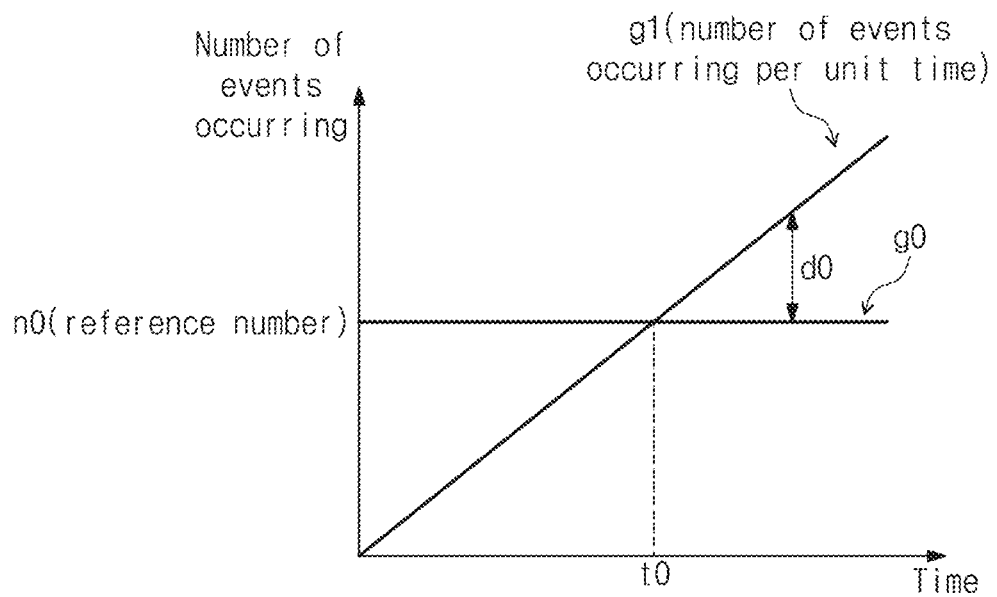
FIG. 2 is a graph illustrating a state of a processor according to some example embodiments.

FIG. 2 is a graph illustrating a state of a processor according to some example embodiments.

Referring to FIG. 2, it is shown that the number of times an event occurs increases with time. The increasing of the number of times an event occurs may mean that the number of outputs of signal s31 may increase.

A graph g0 may represent the number of events to which the processor 300 can respond per unit time. The processor 300 may be capable of response to 'n0' events per unit time.

A graph g1 may represent the number of events occurring per unit time. The number of events occurring per unit time from time 't0' may be greater than a reference number 'n0'. Before the time 't0', the processor 300 may be in a normal state. When the number of the events occurring per unit time is smaller than the reference number 'n0' or the workload of the processor 300 is appropriate (e.g., the workload of the processor 300 is less than or equal to the reference number), the processor 300 may be in the normal state. After the time 't0', the processor 300 may be in the busy state.

After time 't0', a difference value d0 between the graph g1 and the graph g0 may indicate the number of events to which the processor 300 does not respond. The greater the number of the events occurring per unit time, the greater the number of the events to which the processor 300 does not respond. According to some example embodiments, the number of the events to which the processor 300 does not respond may be minimized. When the number of the events occurring per unit time is reduced, the processor 300 according to some example embodiments may respond to the events that have occurred before. When the workload is reduced, the processor 300 may be configured to respond to the events that have occurred before. That is, when the processor 300 enters the normal state, the processor may be configured to be respond to events that have occurred before.

Figure 3:
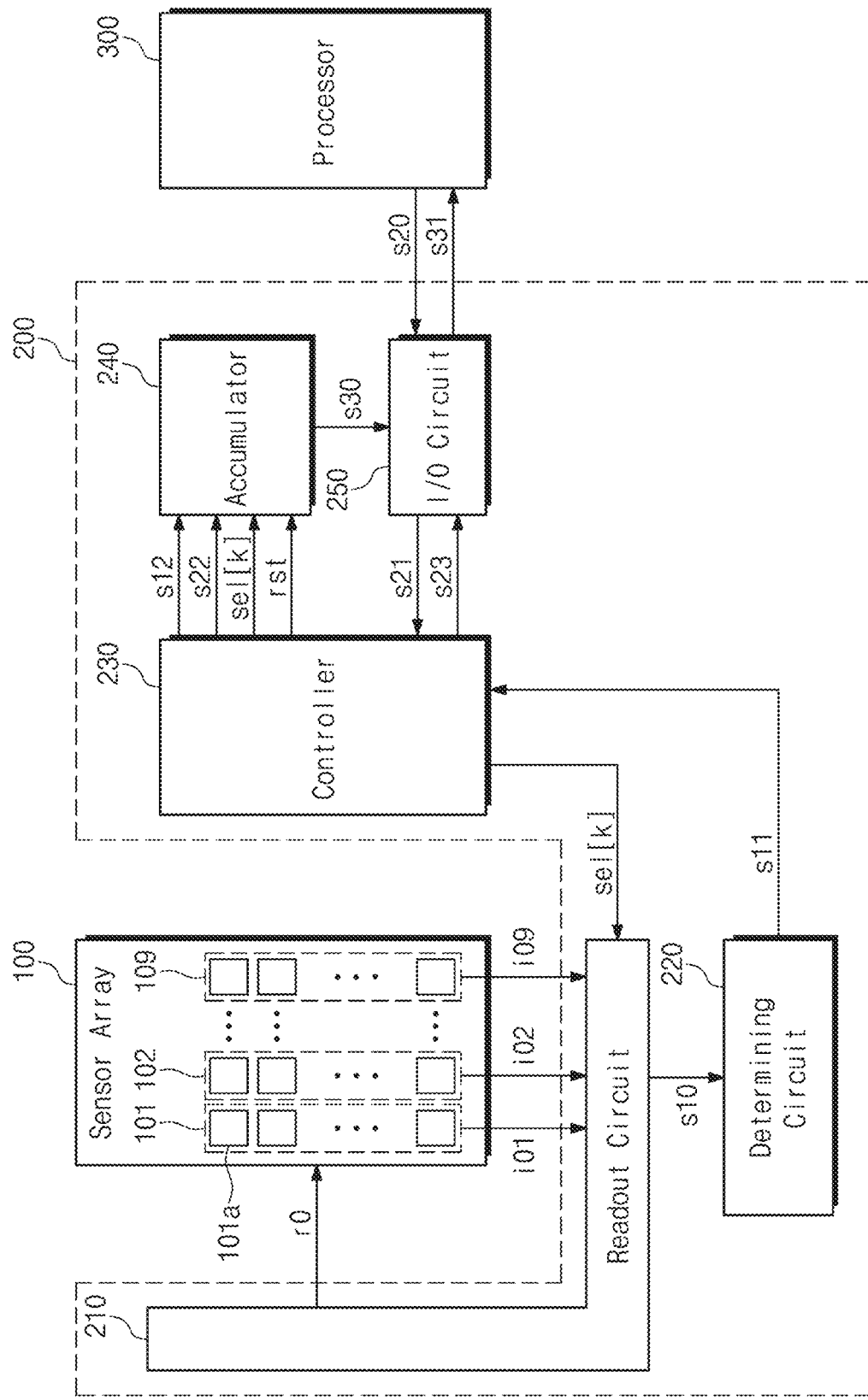
FIG. 3 is a block diagram illustrating an example configuration of a sensor of FIG. 1 according to some example embodiments.

FIG. 3 is a block diagram illustrating an example configuration of a sensor of FIG. 1 according to some example embodiments.

Referring to FIG. 3, the sensor array 100 may include sensing pixels. A sensing pixel 101a may be one of the sensing pixels. The sensing pixels may be configured to receive light from the outside. The sensing pixels may be configured to detect a change in an intensity of the light that is received. When the change in the intensity of the received light is detected, the sensing pixels may be configured to output currents i01, i02, i09 in response to the signal r0. The current i0 of FIG. 1 may include currents i01, i02, i09.

The sensing pixels may be arranged in a column. Column groups 101, 102, and 103 may be groups of the sensing pixels arranged column by column. The column groups 101, 102, and 103 may respectively output currents i01, i02, and i09.

According to a degree of change in the intensity of light, an amount of the currents i01, i02, and i09 may be determined. The currents i01, i02, and i09 may indicate the degree of change in the intensity of light.

The sensing circuit 200 may include a readout circuit 210, a determining circuit 220, a controller 230, an accumulator 240, and an input/output (I/O) circuit 250, etc. but is not limited thereto. A circuit including the accumulator 240 and the I/O circuit 250 may refer to an output circuit. The sensing circuit 200 may be configured to determine occurrence of the event based on the currents i01, i02, and i09. The sensing circuit 200 may be configured to output the signal s31 when it is determined that the event has occurred.

The readout circuit 210 may be configured to receive the currents i01, i02, and i09. The sensing circuit 200 may be configured to process the currents i01, i02, i09 in units of column group. The readout circuit 210 may be configured to receive a signal sel[k] from the controller 230. The readout circuit 210 may be configured to process the current i0k in response to the signal sel[k]. Hereinafter, it is assumed that the controller 230 outputs a signal sel[1].

The readout circuit 210 may be configured to process the current i01 in response to the signal sel[1]. The readout circuit 210 may be configured to output a signal s10 based on the current i01.

The determining circuit 220 may be configured to receive the signal s10. The signal s10 may represent a level of voltage. The level of voltage represented by the signal s10 may be in proportion to the amount of the current i01. The determining circuit 220 may be configured to determine whether the event has occurred, based on the signal s10. Specifically, when the level of voltage is lower than a reference level, the determining circuit 220 may be configured to determine that the event has not occurred. When the level of voltage is higher than the reference level, the determining circuit 220 may be configured to determine that the event has occurred. The determining circuit 220 may be configured to output a signal s11 when it is determined that the event has occurred.

The controller 230 may be configured to receive a signal s11. The controller 230 may be configured to output a signal s12 based on the signal s11. Each of the signals s11 and s12 may represent that the event has occurred.

As described with reference to FIG. 1, when the processor 300 is in the busy state, the processor 300 may be configured to output the signal s20. The I/O circuit 250 may be configured to receive the signal s20. When the signal s20 is received, the I/O circuit 250 may be configured to output a signal s21. The controller 230 may be configured to receive the signal s21. When the signal s21 is received, the controller 230 may be configured to output a signal s22. The signals s20, s21, and s22 may represent that the processor 300 is in the busy state. When the signal s20 is received, the sensing circuit 200 may be configured to operate in the accumulation mode.

For the brevity of description, when the processor 300 is in the busy mode, it is described that the signal s20 may be output. On the contrary, the signal s20 may be output when the processor 300 is in the normal state, and the signal s20 may not be output when the processor 300 is in the busy state. The above description may be applied to all the signals that will be mentioned later.

However, as described with reference to FIG. 1, the sensing circuit 200 may be configured to operate on its own in the accumulation mode even when the signal s20 is not received. The sensing circuit 200 may be configured to determine the state of the controller 230 based on a period when the event occurs. The sensing circuit 200 may be configured to allow the determining circuit 220 and/or the controller 230 to perform an operation determining the state of the controller 230. In some example embodiments, the sensing circuit 200 may allow the accumulator 240, or a component not shown in FIG. 3, to perform an operation determining the state of the controller 230.

The period when the event occurs may be in proportion to the periods when the signals s10, s11, s12, and s31 are output. Hereinafter, the period when the event occurs means the periods when the signals s10, s11, s12, and s31 are output. The sensing circuit 200 may be configured to determine that the controller 230 is in the busy state, when the period when the event occurs is shorter than the periods when the signals s10, s11, s12, and s31 are output. When the event occurs several times, the sensing circuit 200 may compare an average period when the event occurs to a reference period. The sensing circuit 200 may be configured to operate in the accumulation mode, when the period when the event is shorter than the reference period. The reference period may be associated with a processing capability in which the processor 300 performs a task. The sensing circuit 200 may store information about the processing capability of the processor 300. The sensing circuit 200 may be configured to determine the reference period using the information about the processor 300. The reference period may be a desired value or a value preset by a user. The controller 230 may be configured to output the signal s22 when operating in the accumulation mode. When the period when the event occurs is longer than the reference period, the sensing circuit 200 may be configured to determine that the controller 230 is in the normal state. In this case, the sensing circuit 200 may be configured to operate in the normal mode.

The controller 230 may be configured to output a signal sel[k]. The components of the sensing circuit 200 may process the data from the sensor array 100 in units of column group based on the signal sel[k]. Hereinafter, it is assumed that the controller 230 outputs the signal sel[1].

The controller 230 may be configured to output a signal rst. The signal rst may be output when a condition is satisfied in the sensing circuit 200. That the condition is satisfied may means that the state of the processor 300 is changed from the busy state to the normal state. In addition, that the condition is satisfied may means that the operation mode of the sensing circuit 200 is changed from the accumulation mode to the normal mode. The condition will be described in detail with reference to FIGS. 6 and 7.

Whenever the operation mode of the sensing circuit 200 is changed, the controller 230 may transmit a signal indicating that the operation mode is changed, to at least one of the components 210, 220, 240, and 250. For example, the controller 230 may be configured to output a signal s23. The signal s23 may be output when the condition is satisfied in the sensing circuit 200, like the signal rst.

The accumulator 240 may be configured to receive the signals s12, s22, sel[1], and rst. The signal s12 may represent that the event has occurred. The signal s22 may represent the operation mode of the sensing circuit 200. The data obtained from the sensing pixels included in the column group 101 may be processed by the signal sel[1].

The accumulator 240 may be configured to operate based on the signals s12, s22, sel[1], and rst. In the normal mode, the accumulator 240 may be configured to output a signal s30 having a logical value of "1" when receiving the signal s12. In the normal mode, the accumulator 240 may be configured to output the signal s30 having a logical value of "0" when the signal s12 is not received.

In the accumulation mode, the accumulator 240 may be configured to accumulate the signal s12 when receiving the signal s12. That the signal s12 is accumulated may means that the signal s30 having the logical value of "1" outputs from after the signal s12 is received until the signal rst is received. The signal rst may be received when the operation mode of the sensing circuit 200 is changed to the normal mode. For example, once the signal s12 is received in the accumulation mode, the accumulator 240 may be configured to output the signal s30 having the logical value of "1" even while the signal s12 is not received. The components and operations of the accumulator 240 will be described in detail with reference to FIGS. 8 to 11.

The I/O circuit 250 may be configured to receive the signal s30. The I/O circuit 250 may be configured to output the signal s31 based on the signal s30.

When the signal s30 is received in the normal mode, the I/O circuit 250 may be configured to output the signal s31 before the next signal s30 is received. The I/O circuit 250 may be configured to output the signal s31 without delay when the signal s30 is received in the normal mode. When the signal s30 is received in the accumulation mode, the I/O circuit 250 may not output the signal s31 while the sensing circuit 200 operates in the accumulation mode. The I/O circuit 250 may be configured to output the signal s31 after the signal s23 is received. In this case, the signal s31 may include information about the event occurring while the sensing circuit 200 operates in the accumulation mode.

The processor 300 may sense the event based on the signal s31.

Figure 4:
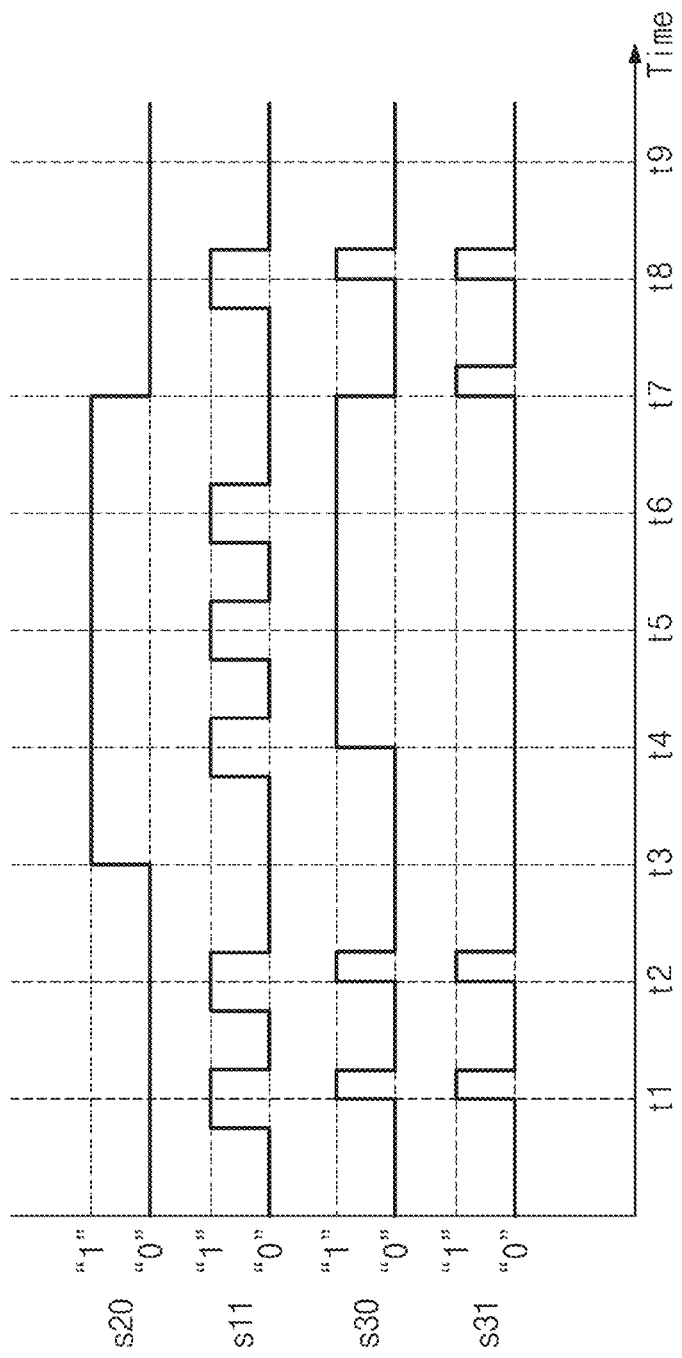
FIG. 4 is a timing diagram illustrating an operation of a sensing circuit according to some example embodiments.
Figure 5:
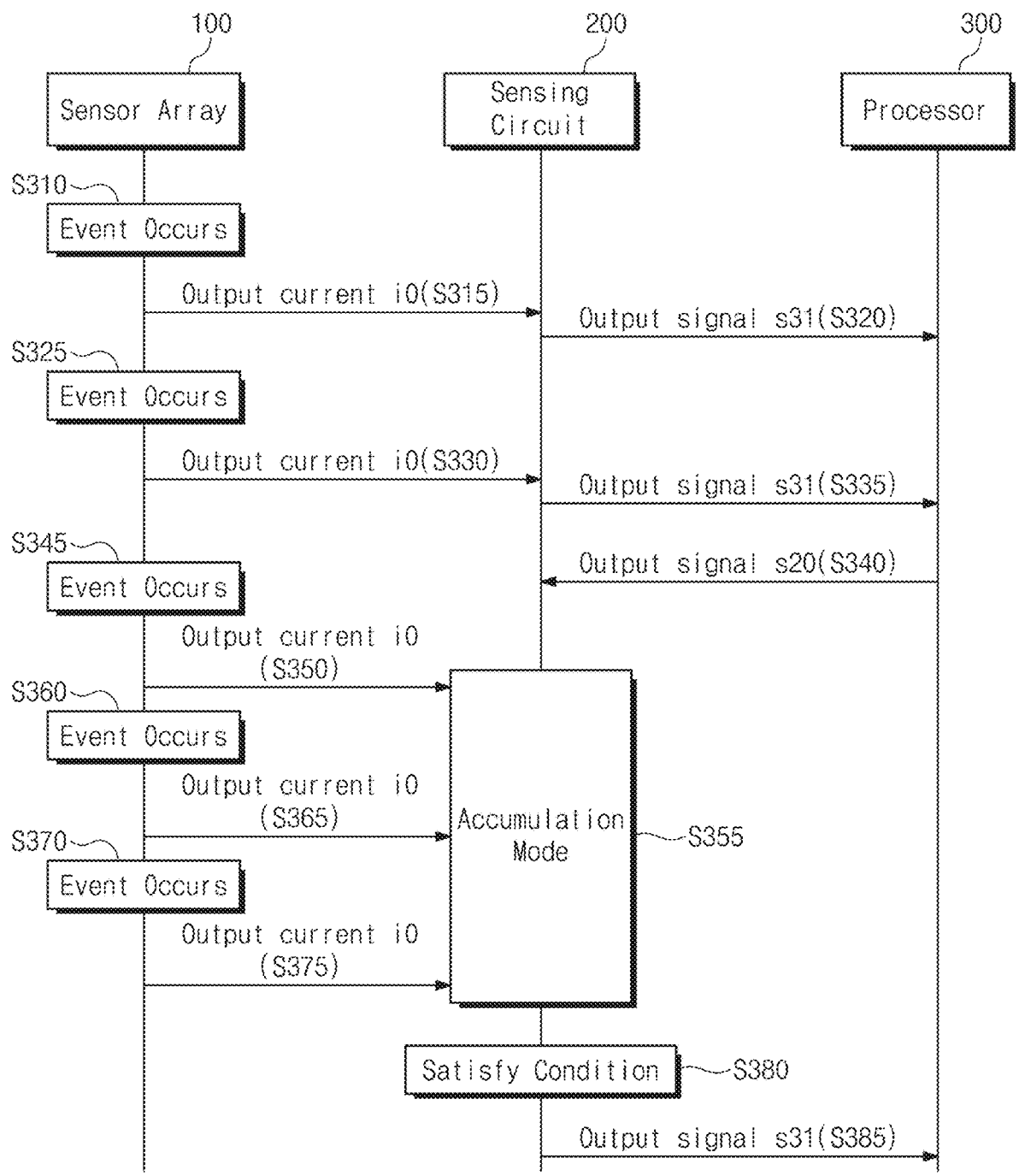
FIG. 5 is a flow chart illustrating an operation of a sensing circuit according to some example embodiments.

FIG. 4 is a timing diagram illustrating an operation of a sensing circuit according to some example embodiments. FIG. 5 is a flow chart illustrating an operation of a sensing circuit according to some example embodiments. Further, in the example of FIG. 5, various operations are described as being performed by some components of a sensing circuit and/or processor according to some example embodiments, such as the example embodiment shown in FIG. 3; however, it is to be appreciated that in other example embodiments, such operations may be performed by circuitry that is differently organized.

Hereinafter, that the signals s11, s20, and s31 are not output may means that the signals s11, s20, and s31 have the logical value of "0". In addition, that the signal s11, s20, and s31 are output may mean that the signals s11, s20, and s30 have the logical value of "1".

Referring to FIGS. 3, 4, and 5, in a time 't1', the sensor array 100 may respond to a stimulus from the outside. Hereinafter, it is assumed that all the stimuli from the outside may be significant stimuli. Thus, that the stimulus comes from the outside to the sensor array 100 may represent that an event occurs. That is, an event may occur at the time 't1', in operation s310. In operation S315, the sensor array 100 may be configured to output the current i0 when the event occurs. The determining circuit 220 may be configured to output the signal s11 based on the current i0.

At the time 't1', the processor 300 may be in the normal state. Thus, the signal s20 may not be output. The sensing circuit 200 may be configured to operate in the normal mode. In this case, the sensing circuit 200 may be configured to output the signal s31 without delay when the signal s11 occurs, in operation 320.

At a time 't2' the sensor 150 may provide substantially the same operations as those provided at the time 't1'. In operation 325, the event may occur at the time 't2'. In operation S330, the sensor array 100 may be configured to output the current i0 when the event occurs. In operation S335, the sensing circuit 200 may be configured to output the signal s31 without delay when the event occurs.

At a time 't3', the processor may be configured to output the signal s20, in operation S340. The sensing circuit 200 may be configured to operate in the accumulation mode when the signal s20 is received. In this case, the workload of the processor 300 may be greater than the reference size. The number of times the signal s31 is output to the processor 300 per unit time may be greater than the reference number. The period when the signal s31 is output may be shorter than the reference period. The sensing circuit 200 may be configured to operate in the accumulation mode even though the signal s20 is not received. Specifically, the sensing circuit 200 may be configured to operate in the accumulation mode when the number of times the signal s11 or s31 is generated per unit time (from the time 't1' to the time 't2') is greater than the reference number (hereinafter, assumed to be '2').

At a time 't4', the event may occur, in operation S345. In operation S350, the sensor array 100 may be configured to output the current i0. The determining circuit 220 may be configured to output the signal s11 based on the current i0. The controller 230 may be configured to output the signal s12 based on the signal s11. In operation S355, the accumulator 240 may be configured to output the signal s30 based on the signal s12. However, unlike at the time 't1' and the time 't2', the sensing circuit 200 may not output the signal s31.

At a time 't5' and a time 't6', the sensor 150 may provide substantially the same operations as those provided at the time 't4'. At the time 't5' and the time 't6', the event may occur, in operations S360 and S370. The sensor array 100 may be configured to output the current i0 when the event occurs, in operations S365 and S375. The determining circuit 220 may be configured to output the signal s11 based on the current i0. The controller 230 may be configured to output the signal s12 based on the signal s11. The accumulator 240 may be configured to accumulate the signal s12 while the signal s20 is output, in operation S355. That is, the accumulator 240 may continuously output the signal s30 between the time 't4' and a time 't7'. Unlike at the time 't1' and the time 't2', the sensing circuit 200 may not output the signal s31 while the signal s20 is output.

At the time 't7', the sensing circuit 200 may be satisfied with the condition, in operation S380. For example, the condition may be that the signal s20 is not received. At the time 't7', the processor 300 may stop the output of the signal s20. In some example embodiments, the condition may be that the reference time 't7'-'t3' elapses from the time 't3' when the signal s20 begins to be received. In some embodiments, the condition may be that the period when the signal s31 is output is longer than the reference period. When the condition is satisfied, the operation mode of the sensing circuit 200 may be changed from the accumulation mode to the normal mode. The sensing circuit 200 may be configured to output the signal s31 when the condition is satisfied, in operation S385.

The signal s31 may include information about the event occurring at the time 't4' (in operation S345), the event occurring at the time 't5' (in operation S360), the event occurring at the time 't6' (in operation S370), and the event occurring at the time 't6' in operation S370. As an example, the signal s31 may represent that the event has occurred during the output of the signal s20. As an example, the signal s31 may include the information about the number of times the event has occurred during the output of the signal s20 and/or about the time when the event occurs. As an example, the signal s31 may include the information about a time length between the time 't4' when the event has occurred first and the time 't7' when the signal s31 is output.

At a time 't8' and a time 't9', the sensor 150 may provide the same operations as those provided at the time 't1' and the time 't2'. Hereinafter, duplicate descriptions are omitted.

Figure 6:
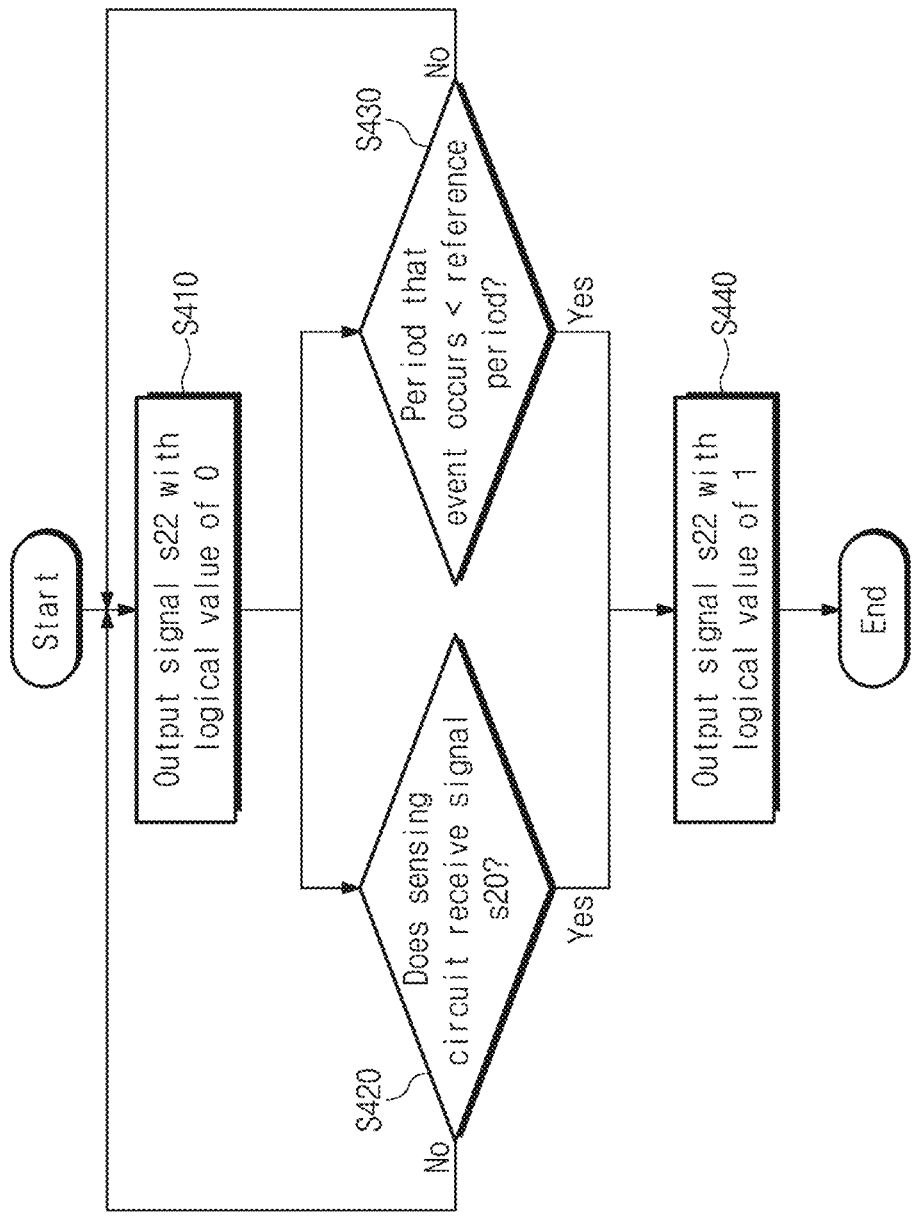
FIG. 6 is a flow chart illustrating an operation in which an operation mode of a sensing circuit is changed according to some example embodiments.

FIG. 6 is a flow chart illustrating an operation in which an operation mode of a sensing circuit is changed according to some example embodiments. Operations S410 to S440 may be performed between the time 't1' and the time 't4' shown in FIG. 4.

Referring to FIGS. 3, 4, and 6, between the time 't1' and the time 't3', the sensing circuit 200 may be configured to operate in the normal mode. In this case, the controller 230 may be configured to output the signal s22 having the logical value of '0', in operation S410.

At the time 't3', the operation mode of the sensing circuit 200 may be changed from the normal mode to the accumulation mode. When the condition is satisfied, the operation mode of the sensing circuit 200 may be changed.

One condition may be that the signal s20 is received. The sensing circuit 200 may sense whether the signal s20 is received, in operation S420. When the processor 300 is in the busy state, the processor 300 may be configured to output the signal s20. The sensing circuit 200 may be configured to operate in the accumulation mode when the signal s20 is received.

Another condition may be that the period when the event occurs is shorter than the reference period. The sensing circuit 200 may compare the period when the event occurs to the reference period, in operation S430. The sensing circuit 200 may be configured to operate in the accumulation mode when the period when the event occurs is shorter than the reference period.

In other words, between the time 't3' and the time 't4', the sensing circuit 200 may be configured to operate in the accumulation mode. The sensing circuit 200 may be configured to operate in the accumulation mode when at least one of the aforementioned conditions is satisfied. The sensing circuit 200 may be configured to output the signal s22 having the logical value of '1', in operation S440.

When the condition is not satisfied, the operations S410 to S430 may be performed repeatedly by the sensing circuit 200.

Figure 7:
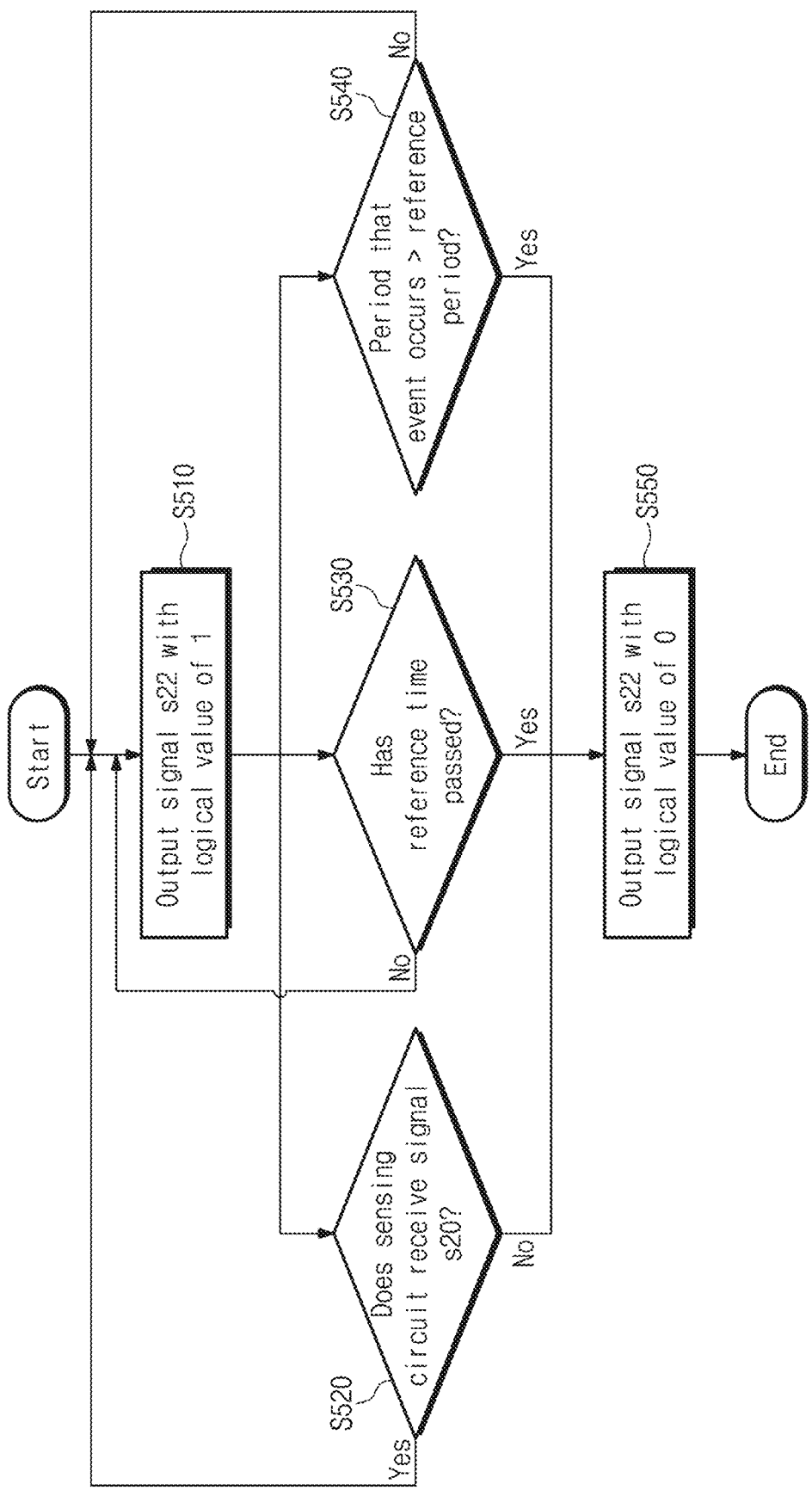
FIG. 7 is a flow chart illustrating an operation in which an operation mode of a sensing circuit is changed according to some example embodiments.

FIG. 7 is a flow chart illustrating an operation in which an operation mode of a sensing circuit is changed according to some example embodiments. Operations S510 to S550 may be performed between the time 't4' and the time 't9' shown in FIG. 4.

Referring to FIGS. 3, 4, and 7, between the time 't4' and the time 't7', the sensing circuit 200 may be configured to operate in the accumulation mode. In this case, the controller 230 may be configured to output the signal s22 having the logical value of '1', in operation S510.

At the time 't7', the operation mode of the sensing circuit 200 may be changed from the accumulation mode to the normal mode. When the condition is satisfied, the operation mode of the sensing circuit 200 may be changed.

One condition may be that the signal s20 is not received. The sensing circuit 200 may sense whether the condition has been satisfied, in operation S520. When the processor 300 is in the normal state, the processor 300 may not output the signal s20. The sensing circuit 200 may be configured to operate in the normal mode when the signal s20 is not received.

Another condition may be that the reference time elapses from the time 't3 when the operation mode of the sensing circuit 200 is changed to the accumulation mode. The sensing circuit 200 may sense whether the reference time has passed, in operation S530. The sensing circuit 200 may be configured to operate in the normal mode when the reference time has elapsed from the time 't3

Still another condition may be that the period when the event occurs is longer than the reference period. The sensing circuit 200 may compare the period when the event occurs to the reference period, in operation S540. The sensing circuit 200 may be configured to operate in the normal mode when the period when the event occurs is longer than the reference period.

In other words, between the time 't7' and the time 't9', the sensing circuit 200 may be configured to operate in the normal mode. The sensing circuit 200 may be configured to operate in the normal mode when at least one of the aforementioned conditions is satisfied. The sensing circuit 200 may be configured to output the signal s22 having the logical value of '0' in the normal mode, in operation S550.

When the condition is not satisfied, the operations S510 to S540 may be performed repeatedly by the sensing circuit 200.

Figure 8:
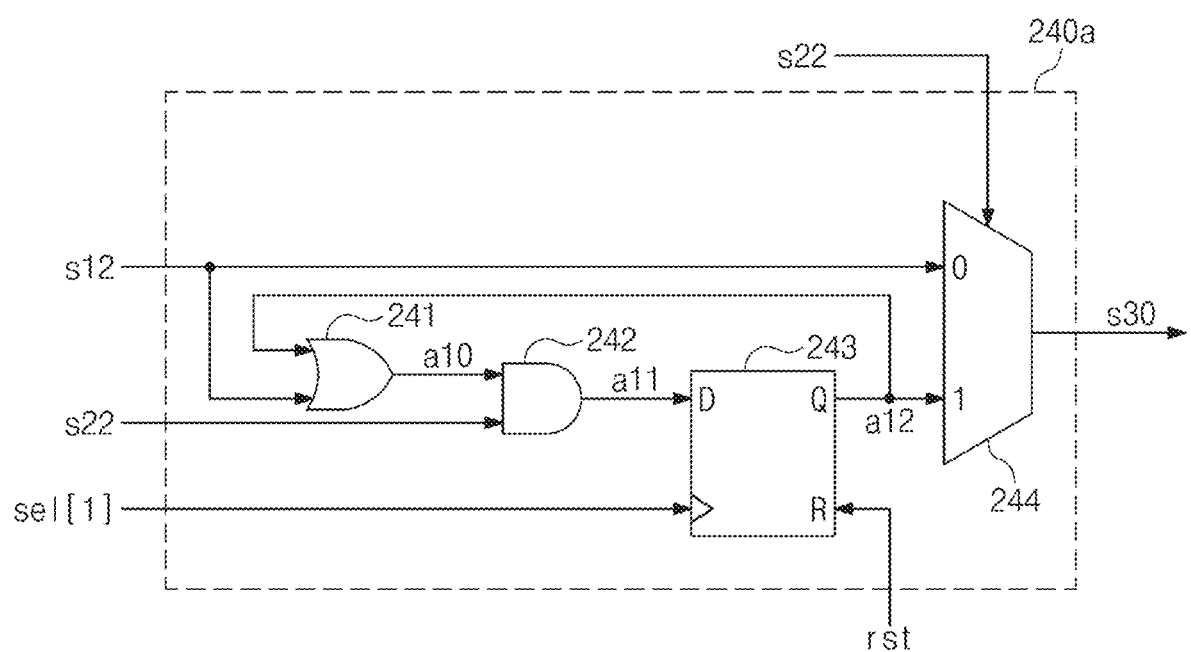
FIG. 8 is a block diagram illustrating an example configuration of an accumulator of FIG. 3 according to some example embodiments.

FIG. 8 is a block diagram illustrating an example configuration of an accumulator of FIG. 3 according to the some example embodiments.

Referring to FIGS. 3 and 8, an accumulator 240a may provide substantially the same operations as those provided by the accumulator 240 shown in FIG. 3. The accumulator 240a include combination circuits 241, 242, 243, and 244. Each of the combination circuits 241, 242, 243, and 244 may be a circuit in which a logical value of a current output signal is determined by logical values of current input signals. For example, the combination circuits 241, 242, 243, and 244 are an OR gate, an AND gate, a D flip-flop, and a multiplexer, respectively, but the inventive concept is not limited thereto.

The accumulator 240 may process the signal (or data) obtained from one sensing pixel 101a. The sensing circuit 200 may include the accumulator 240 as many as the number of sensing pixels included in the sensor array 100. However, the inventive concept is not limited thereto. For example, the accumulator 240a may be configured to process the signal (or data) obtained from the sensing pixels included in, one column group (e.g., 101) or from the sensing pixels included in a portion of the sensor array 100.

The accumulator 240a may be configured to output the signal s30 based on the signals s12, s22, sel[1], and rst.

The combination circuit 241 may be configured to receive the signal s12 and a signal a12. When the events occurs, the signal s12 may be received. When the event occurs, the signal s12 having a first logical value may be received. In this case, when the event does not occur, the s12 having a second logical value different from the first logical value may be received. Hereinafter, for example, the first logical value may refer to a logical value of '1', and the second logical value may refer to a logical value of '0'.

When the event has occurred after the operation mode of the sensing circuit 200 has changed to the accumulation mode, the signal a12 having the logical value of '1' may be received. When the event has not occurred after the operation mode of the sensing circuit 200 has changed to the accumulation mode, the signal a12 having the logical value of '0' may be received.

The combination circuit 241 may be configured to output a signal a10 based on the signals s12 and a12. A logical value of the signal a10 may be determined by the logical values of the signals s12 and a12. When at least one of the signals s12 and a12 has the logical value of '1', the signal a10 may have the logical value of '1'. When all the signals s12 and a12 has the logical value of '0', the signal a10 may have the logical value of '0'.

In other words, when the event has occurred or a new event occurs, in the accumulation mode, the signal a10 having the logical value of '1' may be output. When the event has not occurred in the accumulation mode, the signal a10 having the logical value of '0' may be output.

The combination circuit 242 may be configured to receive the signals a10 and s22. The signal s22 may have the logical value of '1' in the accumulation mode. The signal s22 may have the logical value of '0' in the normal mode. The combination circuit 242 may be configured to output a signal all based on the signals a10 and s22. A logical value of the signal all may be determined based on the logical values of the signals a10 and s22. When at least one of the signals a10 and s22 has the logical value of '0', the signal all may have the logical value of '0'. When all the signals a10 and s22 has the logical value of '1', the signal a11 may have the logical value of '1'.

In other words, the signal a11 may have the logical value of '1' only when the event has occurred after the operation mode of the sensing circuit has changed to the accumulation mode and the sensing circuit 200 operates in the accumulation mode. When the event has not occurred after the operation mode of the sensing circuit has changed to the accumulation mode and when the sensing circuit 200 operates in the normal mode, the signal a11 may have the logical value of '0'.

The combination circuit 243 may be configured to receive the signals a11, sel[1], and rst. The combination circuit 243 may be configured to output the signal a12 based on the signals a11, sel[1], and rst. A logical value of the signal a12 may be determined by the logical value of the signal a11 at a rising edge or a falling edge of the signal sel[1]. Hereinafter, it is assumed that the logical value of the signal a12 is determined by the logical value of the signal all at the rising edge of the signal sel[1]. Specifically, the logical value of the signal a12 may be equal to the logical value of the signal all at the rising edge of the signal sel[1].

The signal a12 output from the combination circuit 243 may be input to the combination circuit 241. When the signal a12 having the logical value of '1' is received by the combination circuit 241 in the accumulation mode by the aforementioned operations, the signal a12 having the logical value of '1' may be output from the combination circuit 243. Once the signal a12 has the logical value of 1', the signal a12 may maintain the logical value of '1' until the signal rst is received.

When the operation mode of the sensing circuit 200 is changed to the normal mode, the signal rst may be received. When the signal rst is received, the combination circuit 243 may be reset. That the combination circuit 243 is reset may mean that the signal a12 having the logical value of 'o' may be output regardless of the logical value of the signal a11. Thus, when the signal rst is received, the signal a12 having the logical value of '0' may be output. In this case, the signal a12 may not maintain the logical value of '1'.

The combination circuit 244 may be configured to receive the signals s12, a12, and s22. The combination circuit 244 may be configured to determine a logical value of the signal s30 based on the signals s12, a12, and s22. Specifically, when the signal s22 has the logical value of '0', the logical value of the signal s30 may be equal to the logical value of the signal s12. When the signal s22 has the logical value of '1', the logical value of the signal s30 may be equal to the logical value of the signal a12. Hereinafter, that the signal s12 is selected may mean that the signal s30 having the same logical value as the logical value of the signal s12 is output. In addition, that signal a12 is selected may mean that the signal s30 having the same logical value as the logical value of the signal a12 is output. Hereinafter, theses may be applied to all the signals In the normal mode, the signal s22 may have the logical value of '0'. In the accumulation mode, the signal s22 may have the logical value of '1'. Therefore, in the normal mode, the accumulator 240a may select the signal s12, and in the accumulation mode, the accumulator 240a may select the signal a12. In other words, in the normal mode, the accumulator 240a may be configured to output the signal s30 having the logical value of '1' whenever the events occurs.

In the accumulation mode, the accumulator 240a may continuously output the signal s30 having the logical value of '1' after the events occurs.

Figure 9:
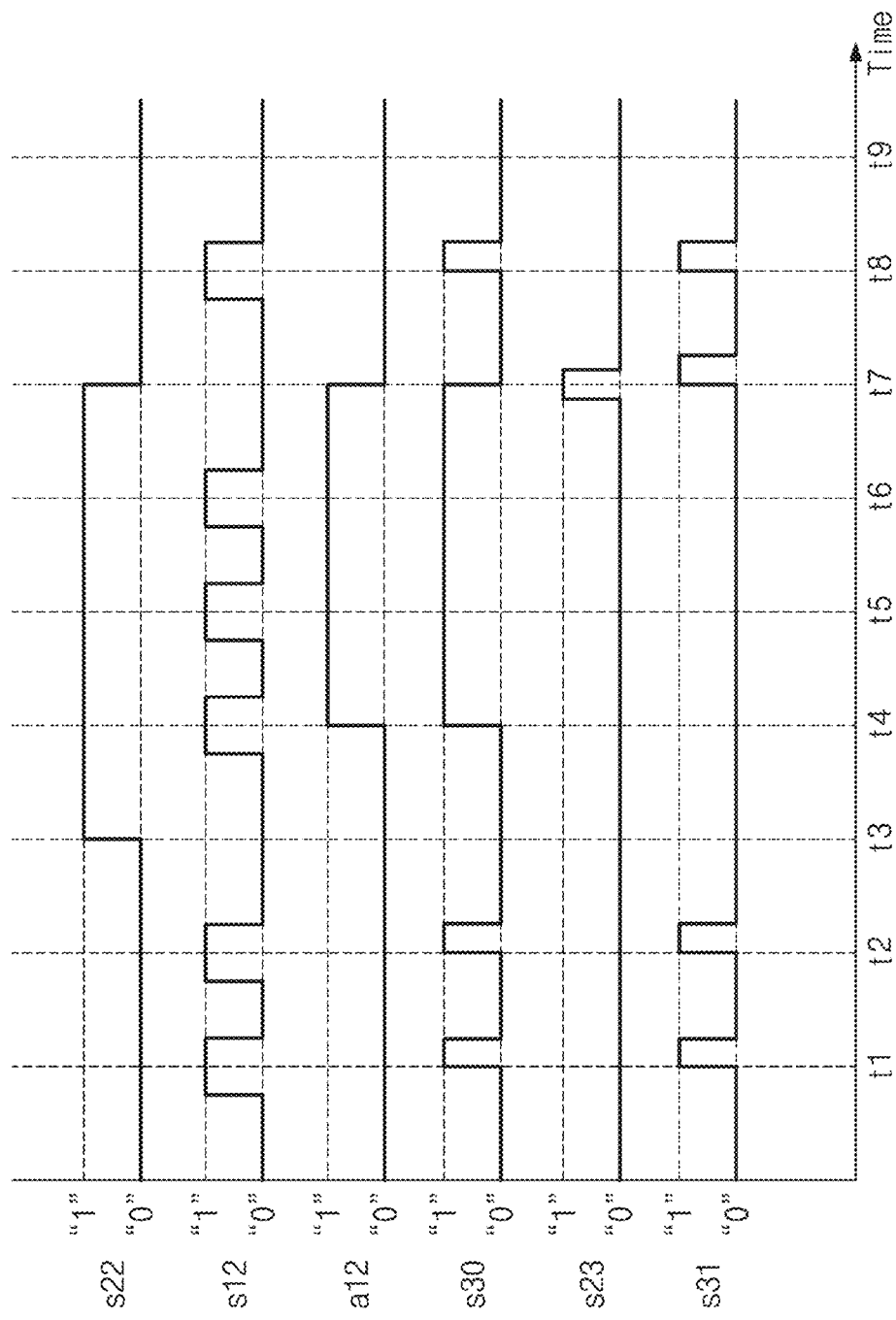
FIG. 9 is a timing diagram illustrating an operation of the accumulator of FIG. 8 according to some example embodiments.
Figure 10:
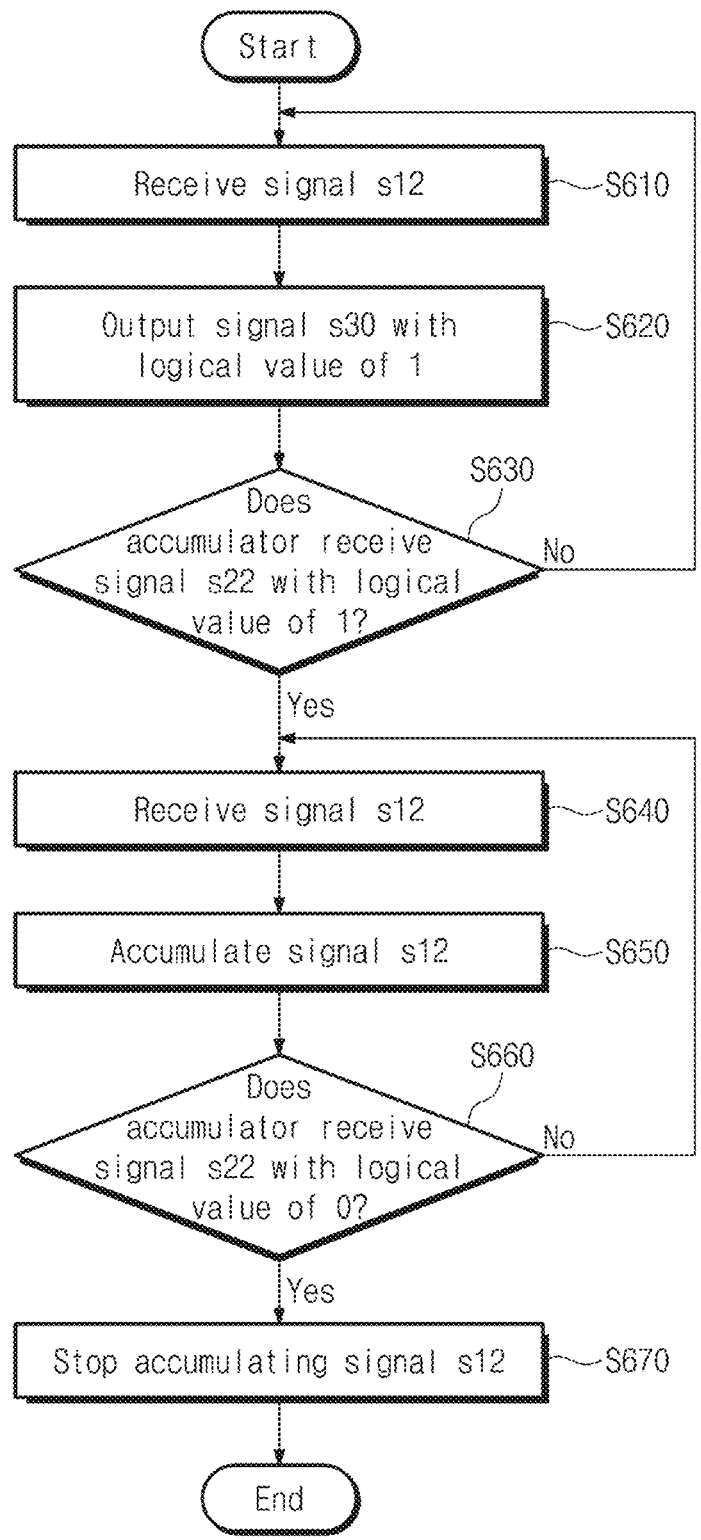
FIG. 10 is a flow chart illustrating an operation of the accumulator of FIG. 8 according to some example embodiments.

FIG. 9 is a timing diagram illustrating an operation of the accumulator of FIG. 8 according to some example embodiments. FIG. 10 is a flow chart illustrating an operation of the accumulator of FIG. 8 according to some example embodiments.

Referring to FIGS. 3, 8, 9, and 10, at the time 't1', the sensing circuit 200 may be configured to operate in the normal mode. The accumulator 240a may be configured to receive the signal s12, in operation S610. Since the signal s22 has the logical value of '0' in the normal mode, the accumulator 240a may select the signal s12. Thus, the accumulator 240a may be configured to output the signal s30 having the logical value of '1' whenever the signal s12 (or the signal s12 having the logical value of '1') is received, in operation S620. In the normal mode, the I/O circuit 250 may be configured to output the signal s31 having the logical value of '1' whenever the signal s30 having the logical value of '1' is received.

The logical value of the signal s22 may be determined depending on the operation mode of the sensing circuit 200. Thus, the accumulator 240a may provide different operations depending on the logical value of the signal s22, in operation S630.

At the time 't2', the sensing circuit 200 may still operate in the normal mode. Thus, the signal s22 may have the logical value of '0', in operation S630 No. In this case, the accumulator 240a may repeatedly provide substantially the same operations as those provided at the time 't1', in operations S610-S630.

At the time 't3', the sensing circuit 200 may be configured to operate in the accumulation mode. Thus, the signal s22 may have the logical value of '1', in operation S630 Yes.

At the time 't4', the accumulator 240a may be configured to receive the signal s12, in operation S640. Since the signal s22 has the logical value of '1' in the accumulation mode, the accumulator 240a may select the signal a12. The signal a12 may have the logical value of '1' when the signal s12 (or the signal s12 having the logical value of '1') is received. The accumulator 240a may be configured to output the signal a12 having the logical value of '1' until the signal rst is received. Thus, the signal s30 may also have the logical value of '1' from after the events occurs until the signal rst is received. In other words, the accumulator 240a may be configured to accumulate the signal s12, in operation 650.

The logical value of the signal s22 may be determined depending on the operation mode of the sensing circuit 200. Thus, the accumulator 240a may provide different operations depending on the logical value of the signal s22, in operation S660.

At the time 't5' and the time 't6', the sensing circuit 200 may still operate in the accumulation mode. Thus, the signal s22 may have the logical value of '1', in operation S660 No. In this case, the accumulator 240a may repeatedly provide substantially the same operations as those provided at the time 't4', in operations S640-S660.

Between the time 't4' and the time 't7', the accumulator 240a may be configured to output the signal s30 having the logical value of '1'. However, the I/O circuit 250 may not output the signal s31 having the logical value of '1', unlike at the time 't1'. As described with reference to FIG. 3, the I/O circuit 250 may not output the signal s31 in the accumulation mode.

At the time 't7', the operation mode of the sensing circuit 200 may be changed from the accumulation mode to the normal mode. As described with reference to FIG. 3, when the operation mode of the sensing circuit 200 is changed to the normal mode again, the controller 230 may be configured to output the signal s23. The I/O circuit 250 may be configured to output the signal s31 when the signal s23 and the signal s30 having the logical value of '1' are received.

When the operation mode of the sensing circuit 200 is changed to the normal mode again, the signal s22 may have the logical value of '0' again, in operation S660 Yes. In addition, the signal rst may be output. When the signal rst is output, the signal a12 may have the logical value of '0'. The accumulator 240a may stop accumulating the signal s12, in operation S670. The accumulator 240 may select the signal s12 again. In other words, the accumulator 240a may be configured to output the signal s30 having the logical value of '1' whenever the signal s12 (or the signal s12 having the logical value of '1') is received. The accumulator 240 may be configured to output the signal s30 having the logical value of '0' while the signal s12 (or the signal s12 having the logical value of '0') is not be received.

Figure 11:
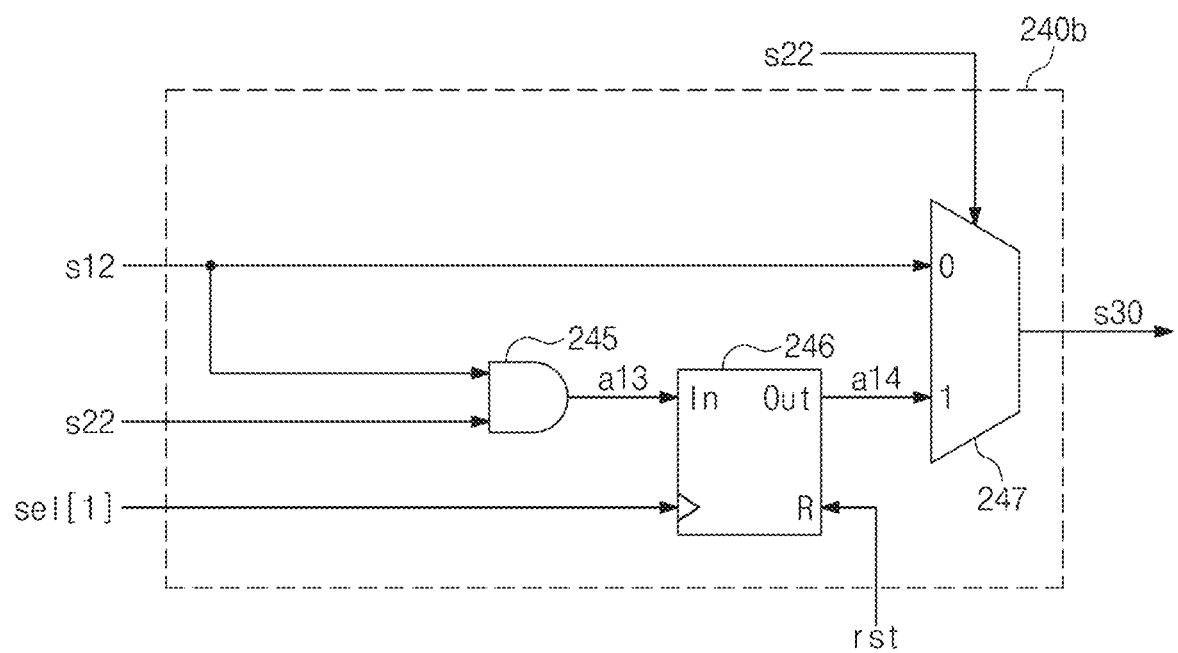
FIG. 11 is a block diagram illustrating an example configuration of an accumulator of FIG. 3 according to some example embodiments.

FIG. 11 is a block diagram illustrating an example configuration of an accumulator of FIG. 3 according to some example embodiments.

Referring to FIGS. 3 and 11, an accumulator 240b may provide substantially the same operations as those provided by the accumulator 240 shown in FIG. 3. The accumulator 240b may provide operations similar to those provided by the accumulator 240a shown in FIG. 8. The accumulator 240b may measure the number of times the event occurs (or the number of times the signal s12 is received) in the accumulation mode, unlike the accumulator 240a shown in FIG. 8.

The accumulator 240b may include combination circuits 245 and 247 and a counter 246. Each of the combination circuits 245 and 247 may be a circuit in which a logical value of a current output signal is determined by logical values of current input signals. Hereinafter, it is assumed that the combination circuits 245 and 247 may be an AND gate and a multiplexer, respectively, but the inventive concept is not limited thereto.

The accumulator 240b may be configured to output the signal s30 based on the signals s12, s22, sel[1], and rst.

The combination circuit 245 may be configured to receive the signals s12 and s22. When the event occurs, the signal s12 may be received. Or, when the event occurs, the signal s12 having the logical value of '1' may be received. In this case, when the event does not occur, the signal s12 having the logical value of '0' may be received. When the sensing circuit 200 operates in the accumulation mode, the signal s22 may have the logical value of '1'. When the sensing circuit 200 operates in the normal mode, the signal s22 may have the logical value of '0'.

The combination circuit 245 may be configured to output a signal a13 based on the signals s12 and s22. A logical value of the signal a13 may be determined based on the logical values of the signals s12 and s22. When at least one of the signals s12 and s22 has the logical value of '0', the signal a13 may have the logical value of '0'. When all the signals s12 and s22 have the logical value of '1', the signal a13 may have the logical value of '1'.

Whenever the event occurs in the accumulation mode, the combination circuit 245 may be configured to output the signal a13 having the logical value of '1'. When the event does not occur in the accumulation mode or the signal s12 is not received, the combination circuit 245 may be configured to output the signal a13 having the logical value of '0'.

The counter 246 may be configured to receive the signals a13, sel[1], and rst. The counter 246 may be configured to output a signal a14 based on the signals a13, sel[1], and rst. The signal a14 may be generated based on the logical value of the signal a13 at the rising edge or the falling edge of the signal sel[1]. Hereinafter, it is assumed that the signal a14 is generated based on the logical value of the signal a13 at the rising edge of the signal sel[1]. The counter 246 may count the number of times the signal a13 having the logical value of '1' is received at the rising edge of the signal sel[1]. The signal a14 may include information about the number of times the signal a13 having the logical value of '1' is received. Whenever the event occurs in the accumulation mode, the combination circuit 245 may be configured to output the signal a13 having the logical value of '1'. In other words, the signal a14 may include information about the number of times the event occurs in the accumulation mode.

As described with reference to FIG. 3, when the operation mode of the sensing circuit 200 is changed to the normal mode, the signal rst may be received. When the signal rst is received, the counter 246 may be reset. That the counter 246 is reset may mean that the information about the number of times the event occurs, stored in the counter 246, may be deleted. Therefore, when the operation mode of the sensing circuit 200 is changed to the accumulation mode again, the number of times the event occurs may be counted from '0'

The combination circuit 247 may be configured to receive the signals s12, a14, and s22. The combination circuit 247 may be configured to determine the logical value of the signal s30 based on the signals s12, a14, and s22. Specifically, when the signal s22 has the logical value of '0', the combination circuit 247 may select the signal s12. When the signal s22 has the logical value of '1', the combination circuit 247 may select the signal a12.

In the normal mode, the signal s22 may have the logical value of '0'. In the accumulation mode, the signal s22 may have the logical value of '1'. Thus, in the normal mode, the accumulator 240b may select the signal s12. In addition, in the accumulation mode, the accumulator 240b may select the signal a12. In the accumulation mode, the accumulator 240b may be configured to output the signal s30. In the accumulation mode, the signal s30 may include information about the number of the events occurring after the operation mode is changed to the accumulation mode.

Figure 12:
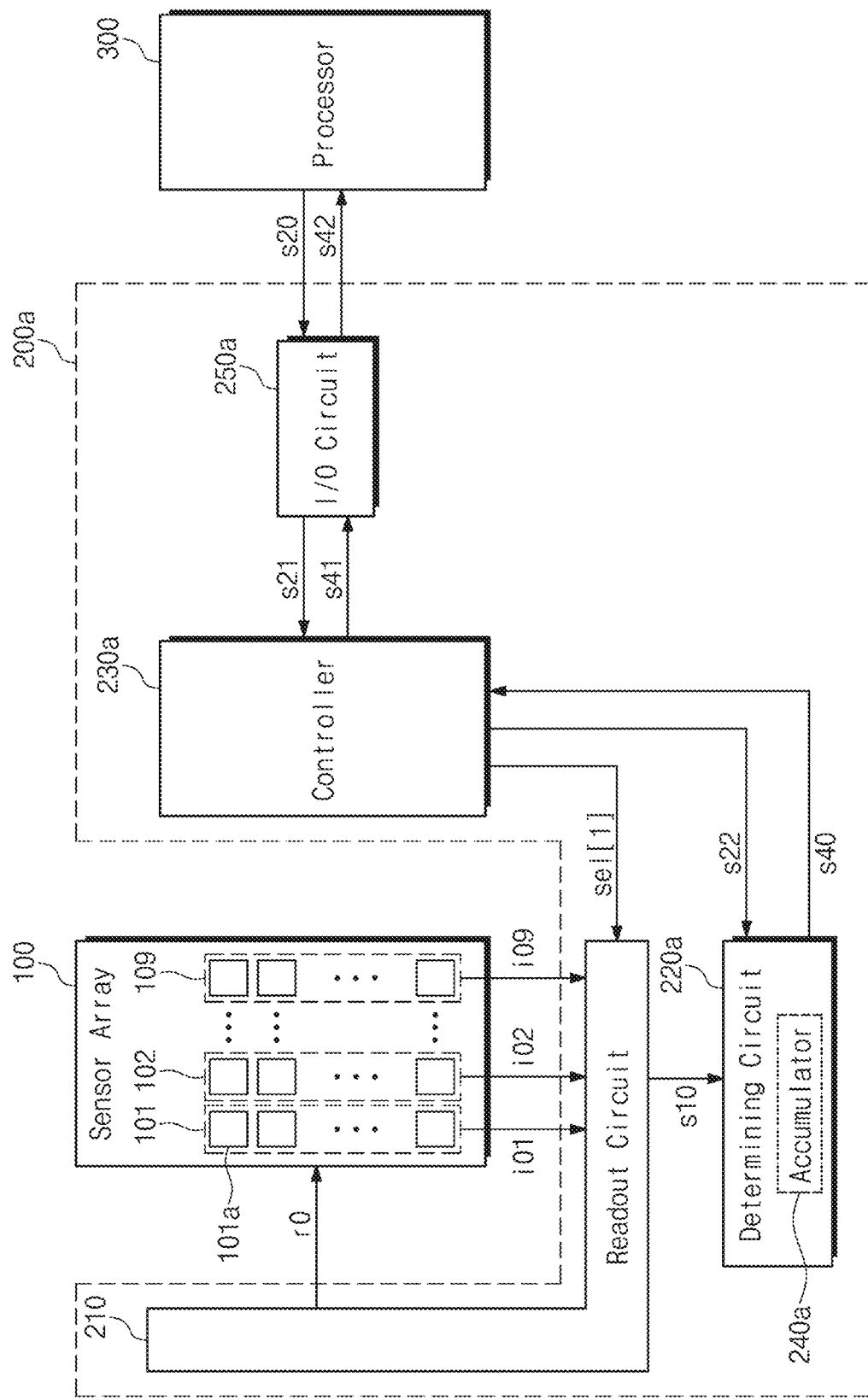
FIG. 12 is a block diagram illustrating an example configuration of a sensing circuit of FIG. 3 according to some example embodiments.

FIG. 12 is a block diagram illustrating an example configuration of a sensing circuit of FIG. 3 according to some example embodiments.

Referring to FIGS. 3 and 12, a sensing circuit 200a may provide operations similar to those provided by the sensing circuit 200 of FIG. 3. However, unlike the sensing circuit 200 of FIG. 3, the sensing circuit 200a may include a determining circuit 220a including the accumulator 240a. In some example embodiments, the accumulator 240a may be located between the determining circuit 220a and a controller 230a.

When the change in the intensity of light is detected, the sensor array 100 may be configured to output the currents i01, i02, and i09 in response to the signal r0. The readout circuit 210 may be configured to receive the currents i01, i02, and i09. The readout circuit 210 may be configured to receive the signal sel[1] from the controller 230a. The readout circuit 210 may process the current i0k in response to the signal sel[1]. The readout circuit 210 may be configured to output the signal s10 based on the current i01.

The determining circuit 220a may be configured to receive the signal s10. The determining circuit 220a may be configured to determine whether the event has occurred, based on the signal s10.

As describe with reference to FIG. 3, when the processor 300 is in the busy state, the processor 300 may be configured to output the signal s20. An input/output (I/O) circuit 250a may be configured to receive the signal s20. The I/O circuit 250a may be configured to output the signal s21 based on the signal s20. The controller 230a may be configured to receive the signal s21. The controller 230a may be configured to output the signal s22 based on the signal s21. That the signals s20, s21, and s22 are output may represent that the processor 300 is in the busy state. On the contrary, that the signals s20, s21, and s22 are not output may represent that the processor is in the normal.

In addition, as described with reference to FIG. 3, the sensing circuit 200a may be configured to determine a state of the processor 300 on its own. An operation in which the sensing circuit 200a determines the processor 300 may be the same as the operation described with reference to FIGS. 6 and 7. When the sensing circuit 200a determines that the processor 300 is in the busy state, the sensing circuit 200a may be configured to operate in the accumulation mode. The controller 230a may be configured to output the signal s22 in the accumulation mode. When the sensing circuit 200a determines that the processor 300 is in the normal mode, the sensing circuit 200a may be configured to operate in the normal mode. The controller 230a may not output the signal s22 in the normal mode. As described with reference to FIG. 3, whenever the operation mode of the sensing circuit 200a is changed, the controller 230a transmits the signal that the operation mode has changed to at least one of the components 210, 220a, 240a, and 250a.

The determining circuit 220a may be configured to receive the signal s22. The determining circuit 220a may provide different operations based on the signal s22.

The determining circuit 220a and the accumulator 240a may be configured to operate in the normal mode while the signal s22 is not received. In the normal mode, the determining circuit 220a may be configured to output a signal s40 whenever the event occurs. In the normal mode, the accumulator 240a may provide substantially the same operations as those provided by the accumulator 240 of FIG. 3. A waveform of the signal s40 may correspond to a waveform of the signal s30. The determining circuit 220a may repeat the operation of outputting the signal s40 and the operation of not outputting the signal s40, depending on the occurrence of the event.

The controller 230a may be configured to receive the signal s40. The controller 230a may be configured to output a signal s41 whenever the signal s40 is received. In the normal mode, the I/O circuit 250a may be configured to receive the signal s41. In the normal mode, the I/O circuit 250a may provide substantially the same operations as those provided by the I/O circuit 250 of FIG. 3. A waveform of a signal 42 may correspond to a waveform of the signal s31 of FIG. 4. The I/O circuit 250a may be configured to output the signal s42 whenever the signal s41 is received.

The determining circuit 220a and the accumulator 240a may be configured to operate in the accumulation mode while the signal s22 is received. In the accumulation mode, the accumulator 240a may provide substantially the same operations as those provided by the accumulator 240 of FIG. 3. The waveform of the signal 40 may correspond to the waveform of the signal s30 of FIG. 4. The determining circuit 220a may not output the signal s40 before the event occurs but may continuously output the signal s40 after the event occurs.

The controller 230a may be configured to receive the signal s40. The controller 230a may be configured to output the signal s41 whenever the signal s40 is received. In the accumulation mode, the I/O circuit 250a may be configured to receive the signal s41. In the accumulation mode, the I/O circuit 250a may provide substantially the same operations as those provided by the I/O circuit 250. The waveform of the signal 42 may correspond to the waveform of the signal s31 of FIG. 4. The I/O circuit 250a may not output the signal s42 in the accumulation mode even when the event occurs in the accumulation mode. When the event occurs in the accumulation mode, the I/O circuit 250a may be configured to output the signal s42 after the operation mode of the I/O circuit 250a is changed to the normal mode.

Figure 13:
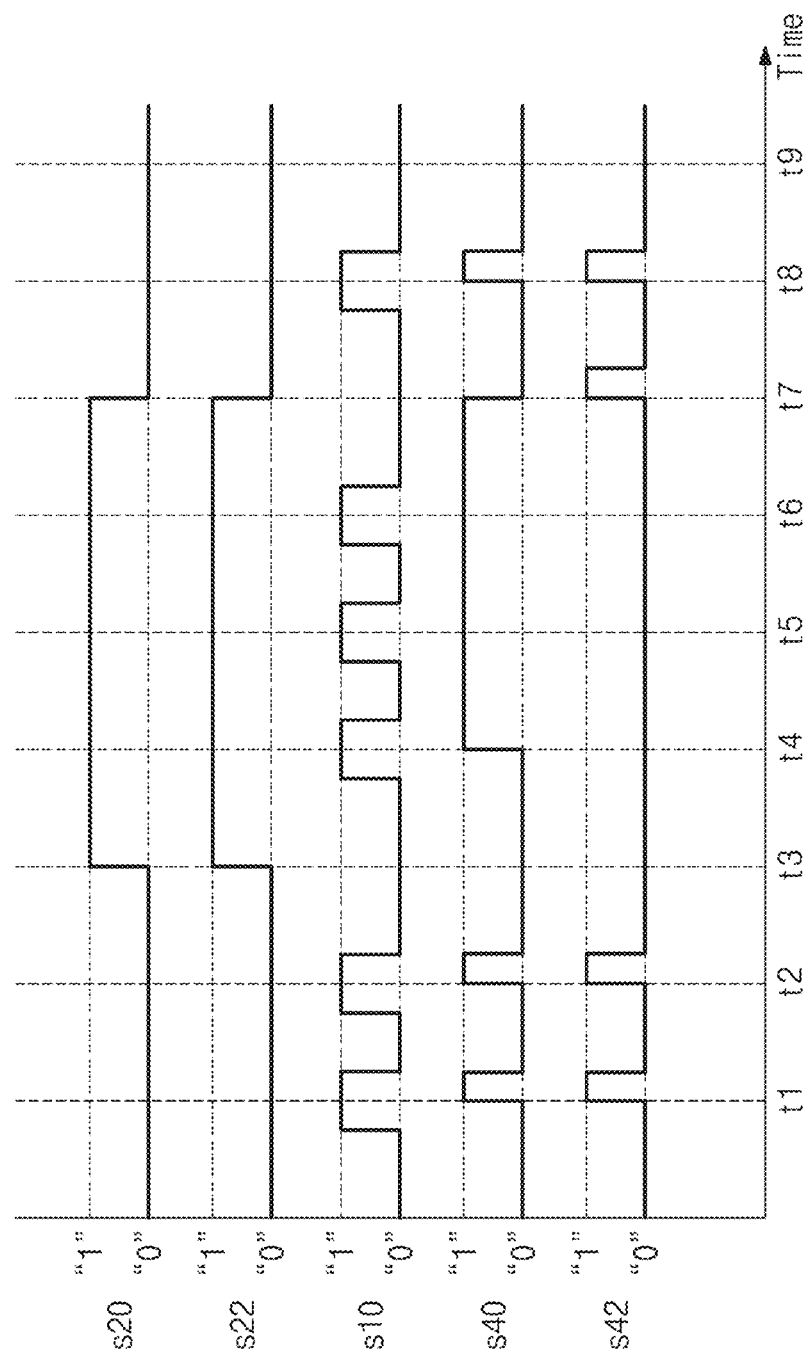
FIG. 13 is a timing diagram illustrating an operation of the sensing circuit of FIG. 12 according to some example embodiments.

FIG. 13 is a timing diagram illustrating an operation of the sensing circuit of FIG. 12 according to some example embodiments.

Hereinafter, that the signals s10, s20, s22, s40, and s42 are output may represent that the signals s10, s20, s22, s40, and s42 having the logical value of '0' may be output. That the signals s10, s20, s22, s40, s42 are output may represent that the signals s10, s20, s22, s40, and s42 having the logical value of '1' may be output.

Referring to FIGS. 12 and 13, between the time 't1' and the time 't3', the processor 300 may be in the normal state. The sensing circuit 200a may be configured to operate in the normal mode. Thus, the signals s20 and s22 having the logical value of '0' may be output.

The determining circuit 220a may be configured to receive the signal s10. Hereinafter, it is assumed that the stimulus from the outside is a significant stimulus. Thus, that the signal s10 having the logical value of '1' is output may mean that the event has occurred. In the normal mode, the determining circuit 220a may be configured to output the signal s40 whenever the event occurs. The I/O circuit 250a may also output the signal s42 whenever the event occurs.

At the time 't3', the operation mode of the sensing circuit 200a may be changed from the normal mode to the accumulation mode.

Between the time 't3' and the time 't7', the processor 300 may be in the busy state. The sensing circuit 200a may be configured to operate in the accumulation mode. Thus, the signals s20 and s22 having the logical value of '1' may be output.

The determining circuit 220a may be configured to output the signal s40 having the logical value of '0' may be output until before the event occurs (until the time 't4'). At the time 't4', the event may occur. The determining circuit 220a may be configured to output the signal s40 having the logical value of '1' when the event occurs. The determining circuit 220a may be configured to output the signal s40 having the logical value of '1' from the time 't4' to the time 't7. The time 't4' may mean a time when the event occurs first in the accumulation mode. The time 't7' may mean a time when the operation mode of the sensing circuit 200a is changed from the accumulation mode to the normal mode.

The I/O circuit 250a may not output the signal s42 in the accumulation mode.

At the time 't7', the operation mode of the sensing circuit 200a may be changed from the accumulation mode to the normal mode. As described with reference to FIG. 9, the I/O circuit 250a may be configured to output the signal s42 in the normal mode. The signal s42 output at the time 't7' may include information about the event occurring in the accumulation mode.

Between the time 't7' and the time 't9', the sensing circuit 200a may provide substantially the same operations as those provided between the time 't1' and the time 't3'. Thus, duplicate descriptions may be omitted.

Figure 14:
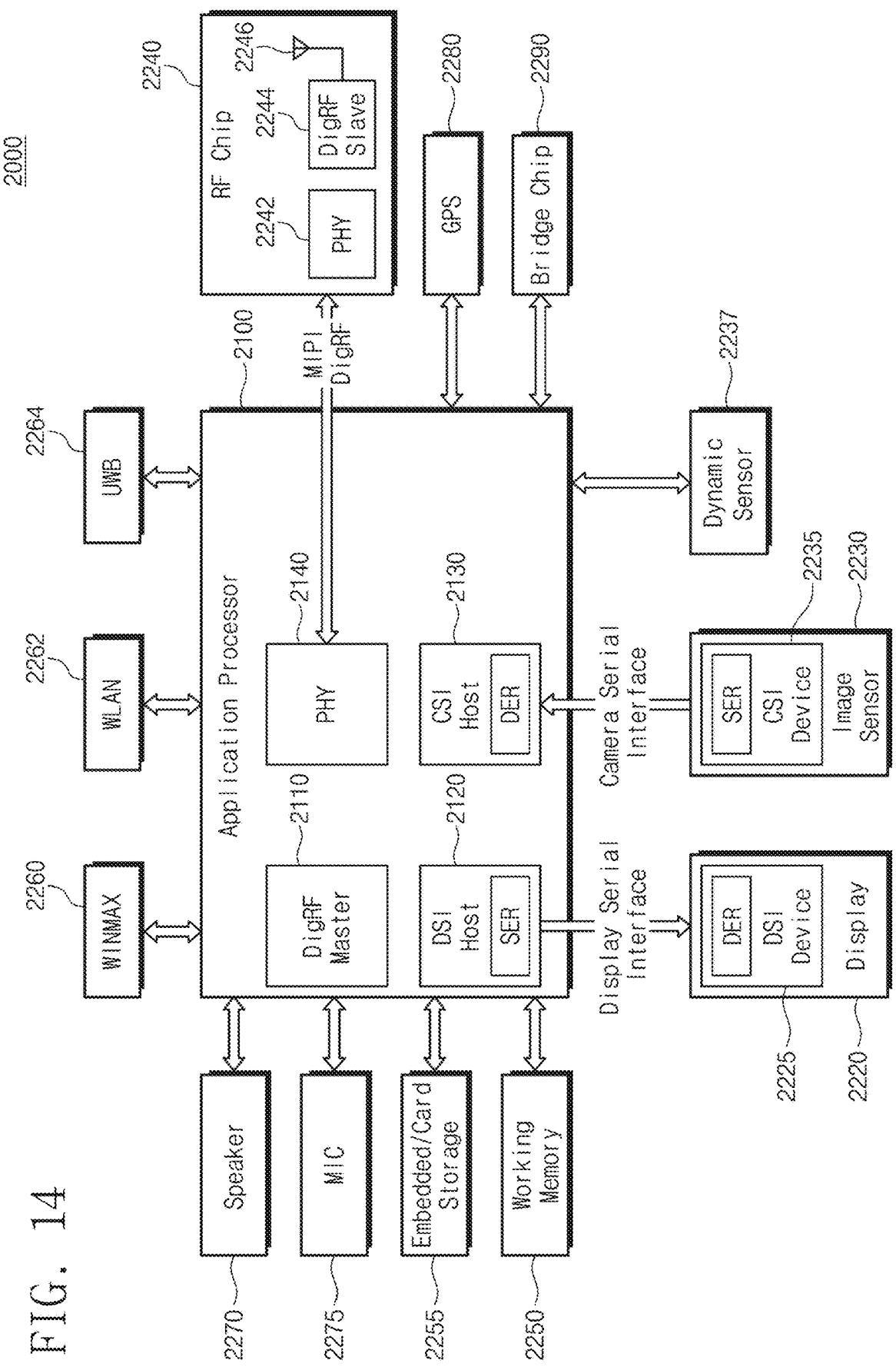
FIG. 14 is a block diagram illustrating an electronic system including a dynamic sensor and interfaces of the electronic system according to some example embodiments.

FIG. 14 is a block diagram illustrating an electronic system including a dynamic sensor and interfaces of the electronic system according to some example embodiments.

Referring to FIG. 14, an electronic system 2000 may be implemented as a data processing device capable of using or supporting an interface proposed by the Mobile Industry Processor Interface (MIPI) Alliance. For example, the electronic system 2000 may be implemented as one of electronic devices, such as a digital camera, a video camcorder, a smart phone, or a wearable device (e.g., a smart watch, a smart band, etc.).

The electronic system 2000 may include an application processor 2100, a display 2220, an image sensor 2230, and a dynamic sensor 2237. The application processor 2100 may include a DigRF master 2110, a Display Serial Interface (DSI) host 2120, a Camera Serial Interface (CSI) host 2130, and a physical layer 2140.

The DSI host 2120 may communicate with a DSI device 2225 of the display 2220 according to the DSI. As an example, an optical serializer (SER) may be implemented in the DSI host 2120. As an example, an optical deserializer (DES) may be implemented in the DSI device 2225. The CSI host 2130 may communicate with a CSI device 2235 of the image sensor 2230 according to the CSI. As an example, an optical deserializer (DES) may be implemented in the CSI host 2130. As an example, an optical serializer (SER) may be implemented in the CSI device 2235.

The application processor 2100 may respond to the event using the dynamic sensor 2237.

As an example, when the electronic system 2000 is implemented as the electronic device (e.g., digital camera or video camcorder) capable of shooting a video, the dynamic sensor 2237 may shoot an object by recognizing a motion of the object or a motion of the electronic system 2000. In other words, the dynamic sensor 2237 may acquire an image data while the object or a surrounding environment including the object changes.

As an example, the application processor 2100 may be used to process the image data from the dynamic sensor 2237. The dynamic sensor 2237 may be configured to output the image data in consideration of a workload of the application processor 2100 or an amount of the image data. The application processor 2100 may efficiently process the image data by the dynamic sensor 2237.

The electronic system 2000 may further include a Radio Frequency (RF) chip 2240 communicating with the application processor 2100. The RF chip 2240 may include a physical layer 2242, a DigRF slave 2244, and an antenna 2246. As an example, the physical layer 2242 of the RF chip 2240 and the physical layer 2140 of the application processor 2100 may exchange data with each other by a DigRF interface proposed by the MIPI alliance.

The electronic system 2000 may further include a working memory 2250 and an embedded/card storage 2255. The working memory 2250 and the embedded/card storage 2255 may store the data provided from the application processor 2100. Further, the working memory 2250 and the embedded/card storage 2255 may provide the data stored therein to the application processor 2100. For example, the working memory 2250 and/or the embedded/card storage 2255 may store the image data.

The working memory 2250 may temporarily store the data processed or to be processed by the application processor 2100. The working memory 2250 may include a volatile memory, such as a static random access memory (SRAM), a dynamic RAM (DRAM), or a synchronous DRAM (SRDRAM) and/or a nonvolatile memory, such as a flash memory, a phase change RAM (PRAM), a magneto-electric RAM (MRAM), a resistive RAM (ReRAM), or a Ferro-electric RAM (FRAM).

The embedded/card storage 2255 may store data regardless of power supply. The embedded/card storage 2255 may include one or more nonvolatile memories, a memory controller, and a buffer. For example, the embedded/card storage 2255 may include at least one of nonvolatile memories, such as a flash memory, a PRAM, an MRAM, a ReRAM, and an FRAM. For example, the embedded/card storage 2255 may be a secure digital (SD) card or an embedded multimedia card (eMMC).

The electronic system 2000 may communicate with an external system through a communication module, such as a Wimax 2260, a Wireless Local Area Network (WLAN) 2262, or an Ultra Wideband (UBM) 2264. However, the inventive concept is not limited thereto. The electronic system 2000 may further include different various communication modules. The communication module of the electronic system 2000 may transceiver the information signal and the image signal according to the inventive concept.

The electronic system 2000 may further include a speaker 2270 and a microphone 2275 for processing voice information. The electronic system 2000 may further include a Global Positioning System (GPS) device 2280 for processing location information. The electronic system 2000 may further include a bridge chip 2290 for managing connection with peripheral devices.

The circuits, the chips, and the devices according to some example embodiment may be mounted using various kinds of semiconductor package. For example, The circuits, the chips, and the devices according to some example embodiment may be mounted using packages, such as a Package on Package (PoP), Ball Grid Arrays (BGAs), Chip Scale Packages (CSPs), a Plastic Leaded Chip Carrier (PLCC), a Plastic Dual In-line Package (PDIP), a Die in Waffle Pack, a Die in Wafer Form, a Chip On Board (COB), a Ceramic Dual In-line Package (CERDIP), a Metric Quad Flat Pack (MQFP), a Thin Quad Flat Pack (TQFP), a Small Outline Integrated Circuit (SOIC), a Shrink Small Outline Package (SSOP), a Thin Small Outline Package (TSOP), a System In Package (SIP), a Multi Chip Package (MCP), a Wafer-level Fabricated Package (WFP), or a Wafer-Level Processed Stack Package (WSP).

In some of the example embodiments and as generally discussed herein, the processor 300 and other circuitry (for example, the sensing circuit 200, the determining circuit 220, accumulator 240, I/O circuit 250, etc.) may include hardware such as logic circuits; a hardware/software combination, such as a processor executing software; or a combination thereof. For example, a processor may include, but is not limited to, a central processing unit (CPU), a graphics processing unit (GPU), an arithmetic logic unit (ALU), a digital signal processor, a microcomputer, a field programmable gate array (FPGA), a System-on-Chip (SoC), a programmable logic unit, a microprocessor, an application-specific integrated circuit (ASIC), etc.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

While some inventive concepts have been shown and described with reference to some example embodiments thereof, it will be understood by those of ordinary skill in the art that various changes in form and details may be made thereto without departing from the spirit and scope of the present inventive concepts as set forth by the following claims.

What is claimed is:

1. A dynamic vision sensor (DVS) comprising:
   a sensor array configured to generate first signals in response to a change in light, the first signals being related to a movement of an object; and
   a sensing circuit configured to generate event signals based on the first signals,
   wherein the DVS is configured control an output of second signals generated based on the event signals to a processor based on a processing capability of the processor, the second signals include information related to the movement of the object and the first signals, and
   wherein the first signals are generated irregularly.

2. The DVS of claim 1, wherein the DVS is further configured to discard the event signals.

3. The DVS of claim 2,
   wherein the DVS is configured to store information about the processing capability of the processor.

4. The DVS of claim 3, wherein the DVS has a first mode and a second mode different from the first mode, and
   wherein the DVS is configured to discard the event signals in the second mode.

5. The DVS of claim 4, wherein the sensing circuit is configured to monitor event occurrences and change modes based on a monitoring result.

6. The DVS of claim 5, wherein the sensing circuit is configured not to transmit the second signals to the processor in the second mode.

7. A dynamic vision sensor (DVS) comprising:
   a sensor array configured to generate first signals in response to a change in light, the first signals being related to a movement of an object; and
   a sensing circuit configured to generate event signals based on the first signals and transmit the event signals to an external processor,
   wherein the DVS has a first mode and a second mode different from the first mode,
   wherein the DVS is configured to selectively operate in the first mode or the second mode based on a processing capability of the external processor,
   wherein the DVS is configured to control an output of second signals generated based on the event signals in the second mode, the second signals include information related to the movement of the object and the first signals, and
   wherein the first signals are generated irregularly.

8. The DVS of claim 7, wherein the DVS is configured to discard the event signals in the second mode.

9. The DVS of claim 8, wherein the DVS is configured to operate in the second mode based on an event rate being more than a reference number, the event rate being a number of times the event signals are received during a reference time.

10. The DVS of claim 9, wherein the sensing circuit is configured to determine an operating mode of the DVS between the first mode and the second mode.

11. The DVS of claim 9, wherein the external processor is configured to determine an operating mode of the DVS between the first mode and the second mode.

12. The DVS of claim 11, wherein the DVS is configured to store information about the processing capability of the external processor.

* * * * *